(12) United States Patent
Niday et al.

(10) Patent No.: US 6,761,034 B2
(45) Date of Patent: Jul. 13, 2004

(54) STRUCTURAL COVER FOR GAS TURBINE ENGINE BOLTED FLANGES

(75) Inventors: David Andrew Niday, Springboro, OH (US); Scott Patrick Ryczek, Cincinnati, OH (US); James Patrick McGovern, Marblehead, MA (US); Gary Charles Liotta, Beverly, MA (US); Gianni Busso, Allston, MA (US)

(73) Assignee: General Electroc Company, Schenectady, NY (US)

(*) Notice: Subject to any disclaimer, the term of this patent is extended or adjusted under 35 U.S.C. 154(b) by 0 days.

(21) Appl. No.: 10/164,954

(22) Filed: Jun. 6, 2002

(65) Prior Publication Data

US 2003/0226362 A1 Dec. 11, 2003

Related U.S. Application Data

(62) Division of application No. 09/733,447, filed on Dec. 8, 2000.

(51) Int. Cl.$^7$ ................................................ F01D 11/00
(52) U.S. Cl. .................. 60/796; 415/174.5; 415/174.4; 415/171.1
(58) Field of Search .......................... 60/796, 797, 798, 60/799, 800; 415/174.5, 171.1, 174.4

(56) References Cited

U.S. PATENT DOCUMENTS

| | | | |
|---|---|---|---|
| 2,445,661 A | * 7/1948 | Constant et al. .............. 60/799 |
| 3,501,089 A | * 3/1970 | Alford ..................... 415/174.4 |
| 4,190,397 A | * 2/1980 | Schilling et al. ............ 415/112 |
| 4,245,959 A | * 1/1981 | Carreno .................. 416/198 A |
| 4,502,276 A | 3/1985 | Pask |
| 5,090,865 A | * 2/1992 | Ramachandran et al. ... 415/112 |
| 5,211,536 A | * 5/1993 | Ackerman et al. .......... 415/177 |
| 5,230,540 A | 7/1993 | Lewis et al. |
| 5,332,358 A | 7/1994 | Hemmelgarn et al. |
| 5,383,652 A | 1/1995 | Van Den Berg |
| 5,402,636 A | * 4/1995 | Mize et al. .................... 60/806 |
| 5,445,469 A | * 8/1995 | Huck et al. .................... 60/799 |
| 5,522,698 A | * 6/1996 | Butler et al. ............. 415/171.5 |
| 5,816,776 A | * 10/1998 | Chambon et al. ......... 415/174.5 |
| 5,984,630 A | * 11/1999 | Di Salle et al. ......... 415/174.5 |
| 6,082,959 A | 7/2000 | Van Duyn |
| 6,095,750 A | * 8/2000 | Ross et al. ............... 415/174.5 |
| 6,210,283 B1 | 4/2001 | Wojciechowski et al. |
| 6,220,015 B1 | 4/2001 | Mina |
| 6,283,712 B1 | 9/2001 | Dziech et al. |

* cited by examiner

Primary Examiner—Ted Kim
(74) Attorney, Agent, or Firm—Nathan Herkamp; Armstrong Teasdale LLP; Robert B. Reeser, III

(57) ABSTRACT

A method enables a structural cover for a gas turbine engine to be manufactured. The method includes forming a torroidial body including an integrally-formed windage cover portion and a seal flange portion, and forming a plurality of fastener openings extending from a forward side of the torroidial body to an aft side of the torroidial body, such that when installed in the gas turbine engine, the windage cover portion facilitates shielding the fastener openings from a gas flow path.

14 Claims, 5 Drawing Sheets

STRUCTURAL COVER FOR GAS TURBINE ENGINE BOLTED FLANGES

This is a divisional of application Ser. No. 09/733,447, filed Dec. 8, 2000.

BACKGROUND OF THE INVENTION

This invention relates generally to gas turbine engines, and more specifically to structural covers used with gas turbine engine bolted flanges.

At least some known gas turbine engines include a core engine having, in serial flow arrangement, a high pressure compressor which compresses airflow entering the engine, a combustor which burns a mixture of fuel and air, and a turbine which includes a plurality of rotor blades that extract rotational energy from airflow exiting the combustor.

Often components within the gas flowpath are coupled together using bolted flanges. Because of the velocity of air within the gas flow path, exposed fasteners in the bolted flanges may cause undesirable disruptions in the flow path downstream from the bolted flange. Such disruptions commonly known as windage, may adversely affect engine performance.

To facilitate eliminating windage caused by exposed fasteners, at least some known bolted flanges include a separate windage cover which extends over the heads or nuts of the fasteners to facilitate minimizing fastener exposure to the gas flowpath. However, because of the thickness of the covers, longer fasteners and an additional alignment flange must be used in comparison to those bolted flanges which do not include the covers. As such, installing such covers increases overall manufacturing assembly time, parts count, engine weight, and overall manufacturing costs.

BRIEF SUMMARY OF THE INVENTION

In one aspect of the invention, a method for manufacturing a structural cover for a gas turbine engine is provided. The method comprises forming a torroidial body including an integrally-formed windage cover portion and a seal flange portion, and forming a plurality of fastener openings extending from a forward side of the torroidial body to an aft side of the torroidial body, such that when installed in the gas turbine engine, the windage cover portion facilitates shielding the fastener openings from a gas flow path.

In another aspect of the invention, a structural cover for a gas turbine engine is provided. The cover includes a torroidial body including an integrally-formed windage cover portion, a seal flange portion, and at least one fastener opening extending therethrough, wherein the windage cover portion is for shielding a fastener from a gas flow path.

In a further aspect of the invention, a gas turbine including a torrodial structural cover is provided. The cover includes an integrally-formed windage cover portion, a seal flange portion, and a plurality of fastener openings extending therethrough. The windage cover portion is configured to facilitate sheilding fasteners extending through the fastener openings from a gas flow path.

DETAILED DESCRIPTION OF THE INVENTION

Figure 1:
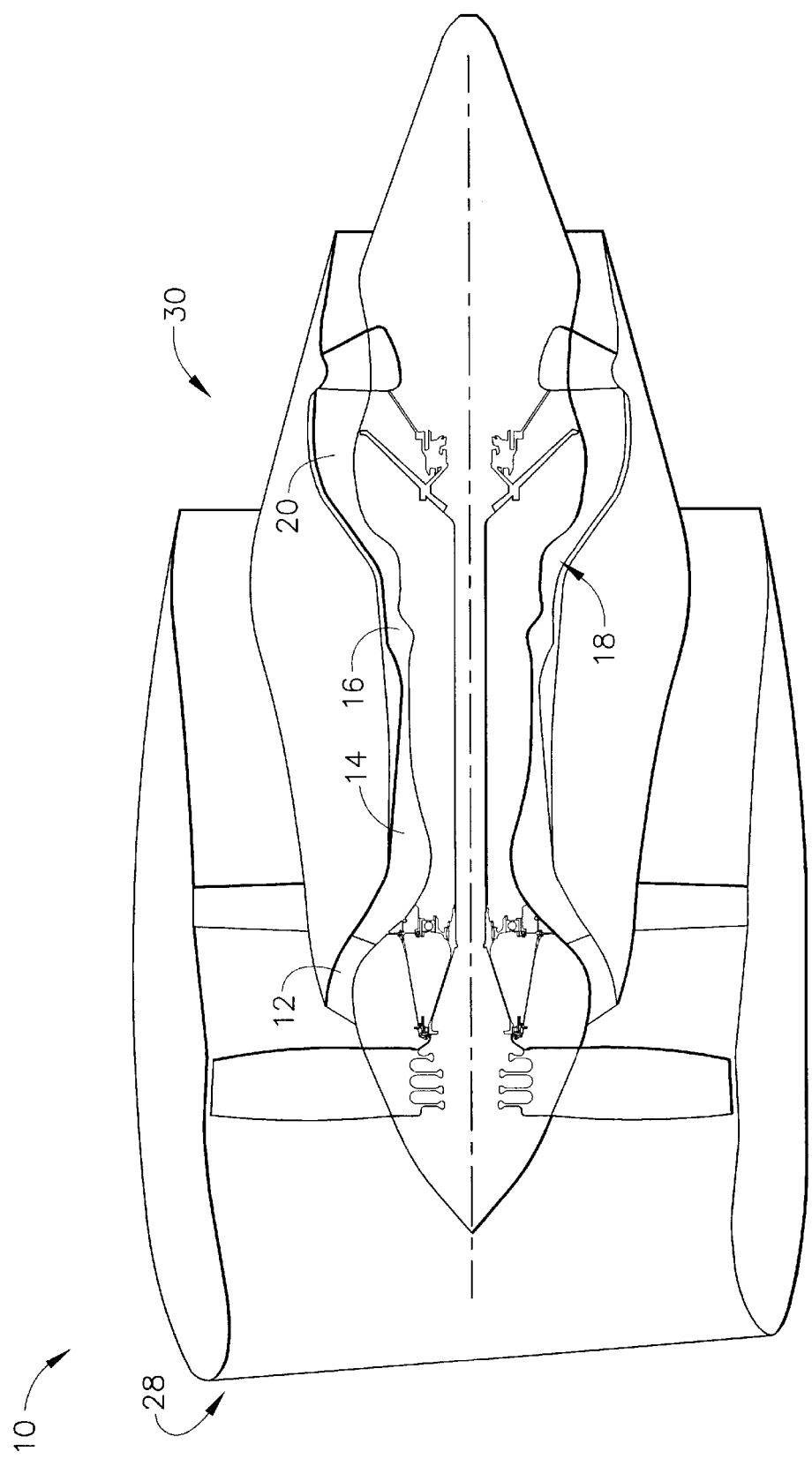
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine assembly 18 and a low pressure turbine assembly 20. Engine 10 has an intake side 28 and an exhaust side 30. In one embodiment, engine 10 is a CF34 engine commercially available from General Electric Aircraft Engines, Cincinnati, Ohio.

In operation, air flows through fan assembly 12 and compressed air is supplied to high pressure compressor 14. The highly compressed air is delivered to combustor 16. Airflow from combustor 16 drives turbines 18 and 20, and turbine 20 drives fan assembly 12. Turbine 18 drives high pressure compressor 14.

Figure 2:
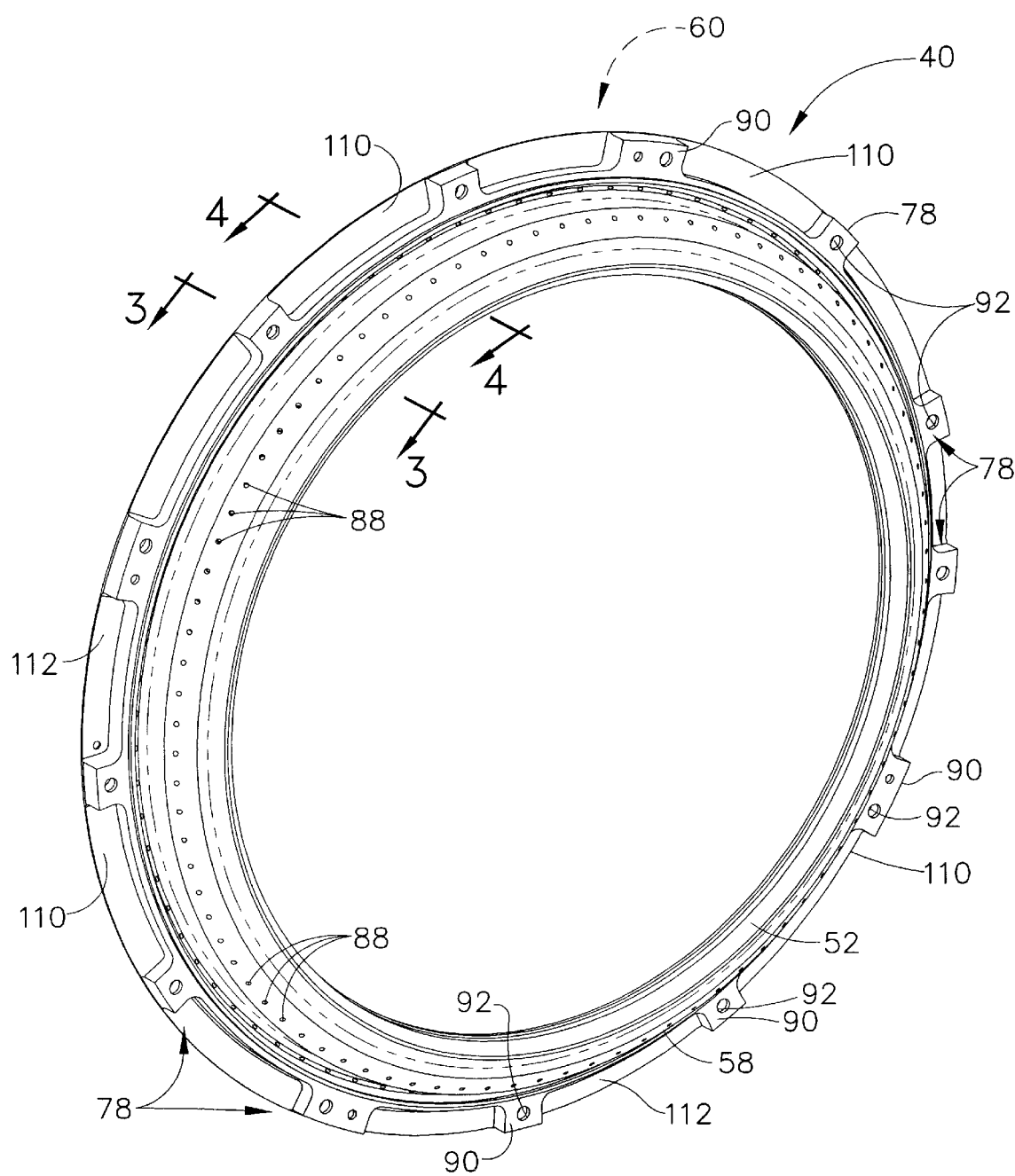
FIG. 2 is a perspective view of a structural cover that may be used with the gas turbine engine shown in FIG. 1.
Figure 3:
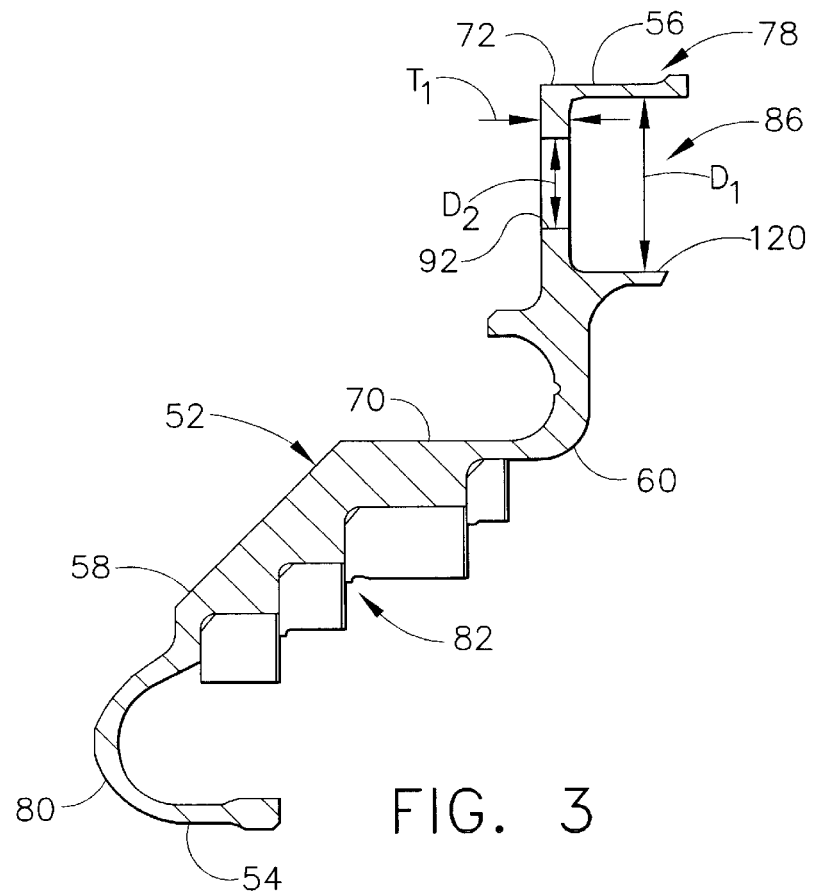
FIG. 3 is a cross-sectional view of the structural cover shown in FIG. 2 and taken along line 3—3.
Figure 4:
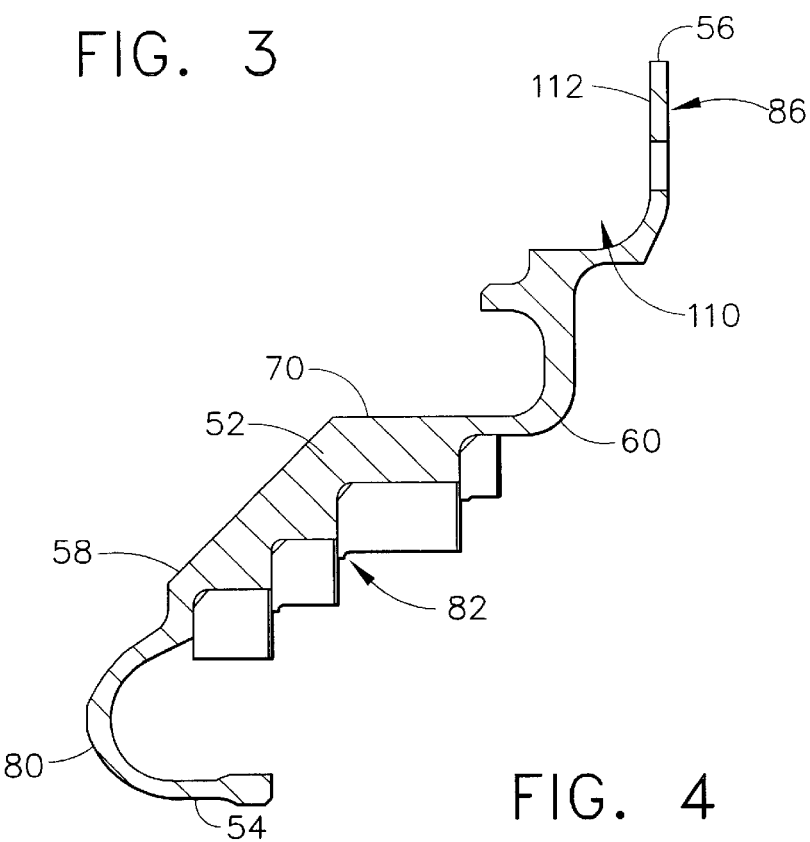
FIG. 4 is a cross-sectional view of the structural cover shown in FIG. 2 and taken along line 4—4.
Figure 5:
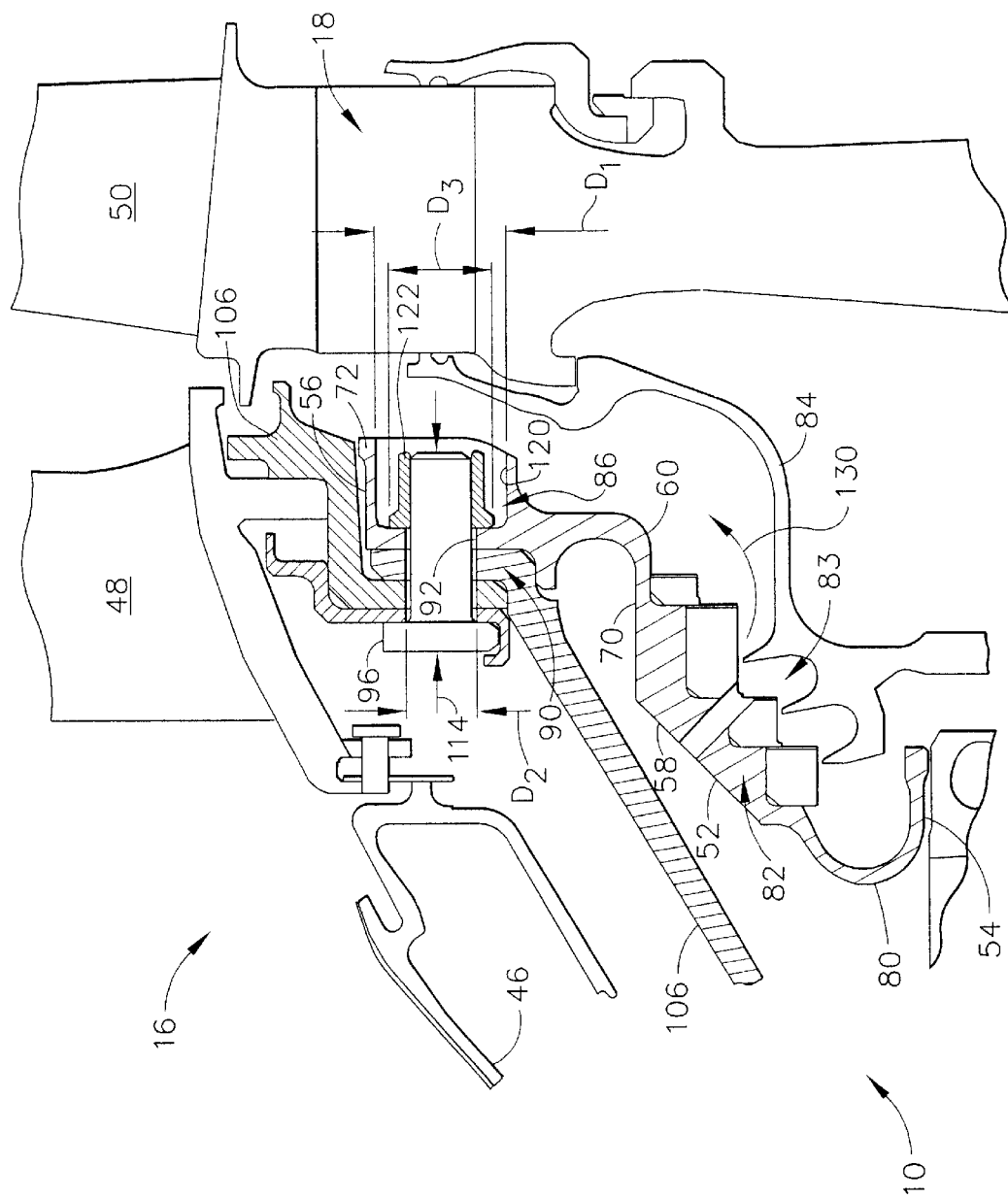
FIG. 5 is a partial cross-sectional view of a gas turbine engine including the structural cover shown in FIG. 2 and taken along line 3—3.

FIG. 2 is a perspective view of a structural cover 40 that may be used with gas turbine engine 10. FIG. 3 is a cross-sectional view of structural cover 40 taken along line 3—3, and FIG. 4 is a cross-sectional view of structural cover 40 taken along line 4—4. FIG. 5 is a partial cross-sectional view of gas turbine engine 10 including structural cover 40 taken along line 3—3. In the exemplary embodiment, structural cover 40 is a forward outer seal flange and is coupled within engine 10 to high pressure turbine assembly 18 downstream from combustor 16. More specifically, combustor 16 includes a liner 46 that extends downstream to a turbine nozzle 48, such that airflow from combustor 16 is discharged through turbine nozzle 48. Structural cover 40 is coupled radially inward from turbine nozzle 48 and upstream from a first stage of high pressure turbine blades 50.

Structural cover 40 is annular and includes a torrodial body 52 that extends radially between an inner perimeter 54 and an outer perimeter 56. Body 52 also extends axially between a forward side 58 and an aft side 60. Torrodial body 52 is frusto conical, such that when coupled within engine 10, outer perimeter 56 is radially outward from, and axially-downstream from, inner perimeter 54.

Body 52 includes an integrally-formed windage cover portion 70 and a seal flange portion 72. More specifically windage cover portion 70 extends from inner perimeter 58 to outer perimeter 56, and seal flange portion 72 extends from windage cover portion 70 arcuately along portions 78 of outer perimeter 56.

Cover inner perimeter 54 is defined by an arcuate lip 80 that extends to a body seal portion 82. Body seal portion 82 facilitates forming a seal 83 with a high pressure turbine seal member 84, and extends between lip 80 and a body coupling portion 86. In the exemplary embodiment, when cover 40 is coupled within engine 10, because body 52 is frusto-conical, cover seal portion 82 extends obliquely from lip 80 with respect to an engine centerline axis of symmetry (not shown). Additionally, in the exemplary embodiment, structural cover seal portion 82 includes a plurality of cooling openings 88 extending therethrough. More specifically, cover coupling portion 86 extends from cover seal portion 82 to body outer perimeter 56 and facilitates coupling structural cover 40 within engine 10. In the exemplary embodiment, cover coupling portion 86 is substantially perpendicular with respect to the engine centerline axis of symmetry.

A plurality of fastener bosses 90 are spaced circumferentially along body outer perimeter 56 within cover coupling portion 86. Each fastener boss 90 includes at least one fastener opening 92 extending therethrough between cover forward side 58 to cover aft side 60. More specifically, openings 92 are sized to receive a fastener 96 therethrough for coupling cover 40 within engine 10. In the exemplary embodiment, openings 92 extend axially through bosses 90 and are substantially parallel to the engine centerline axis of symmetry.

Adjacent fastener bosses 90 are separated along body outer perimeter 56 by at least one scalloped pocket 110. More specifically, scalloped pockets 110 are spaced circumferentially along body outer perimeter within cover coupling portion 86. Each scalloped pocket 110 is arcuate in shape and extends radially inwardly from cover outer perimeter 56 to a radially inner pocket surface 112. More specifically, each scalloped pocket 110 extends from cover forward side 58 towards cover aft side 60. Accordingly, scalloped pockets 110 do not penetrate cover aft side 60, but instead facilitate reducing an overall weight of structural cover 40, thus facilitating an overall improvement in engine performance.

Seal flange portion 72 extends from windage cover portion 70 arcuately along portions 78 of outer perimeter 56 and facilitates alignment of cover 40 within engine 10. More specifically, seal flange only extends along outer perimeter 56 adjacent each fastener boss 90, such that each fastener boss 90 defines a portion of seal flange portion 72. Furthermore, because seal flange portion 72 is integrally formed with windage cover portion 70 and bosses 90, a thickness $T_1$ of seal flange portion 72 does not necessitate an increased length 114 of fastener 96 when cover 40 is coupled within engine 10.

Seal flange portion 72 includes a recessed opening 120 that facilitates shielding fasteners 96 and retainers 122 coupled to fasteners 96 from the gas flowpath 130 within engine 10. Each recessed opening 120 extends from an aft side 60 of each boss 90 towards a forward side 58 of each boss 90. Furthermore, each recessed opening 120 has a diameter D1 which is larger than a D2 of each fastener opening 92. More specifically, each recessed opening 120 is positioned substantially concentrically with respect to each fastener opening 98. Recessed opening diameter D1 is also larger than an outer diameter D3 of each fastener retainer 122. Boss thickness T1 is measured between each respective boss forward side 58 and recessed opening 120.

During installation, fasteners 96 are extended through a plurality of engine structural mounting components 106 and into each respective cover fastener opening 92. Fasteners 96 are then extended into recessed openings 120 and retainers 122 are coupled to fasteners 96 to secure cover 40 within engine 10 with respect to engine components 106. In the exemplary embodiment, fasteners 96 are bolts, and retainers 122 are nuts threadably coupled to the bolts. Because cover 40 is integrally formed with seal flange portion 72 and windage cover portion 70, additional flanges are not required for alignment of cover 40 with respect to engine 10, and an additional windage cover is not necessary to facilitate shielding fasteners 96 and retainers 122. Additionally, cover 40 facilitates fasteners 96 having a shorter length 114 than other known covers coupled to the same engine components 106. In addition, as will become more clear below, because cover 40 is integrally formed with seal flange portion 72 and windage cover portion 70, an overall length of engine 10 is shorter in comparison to known covers including separate seal flanges and windage covers, thus facilitating reducing an overall weight of engine 10.

Figure 6:
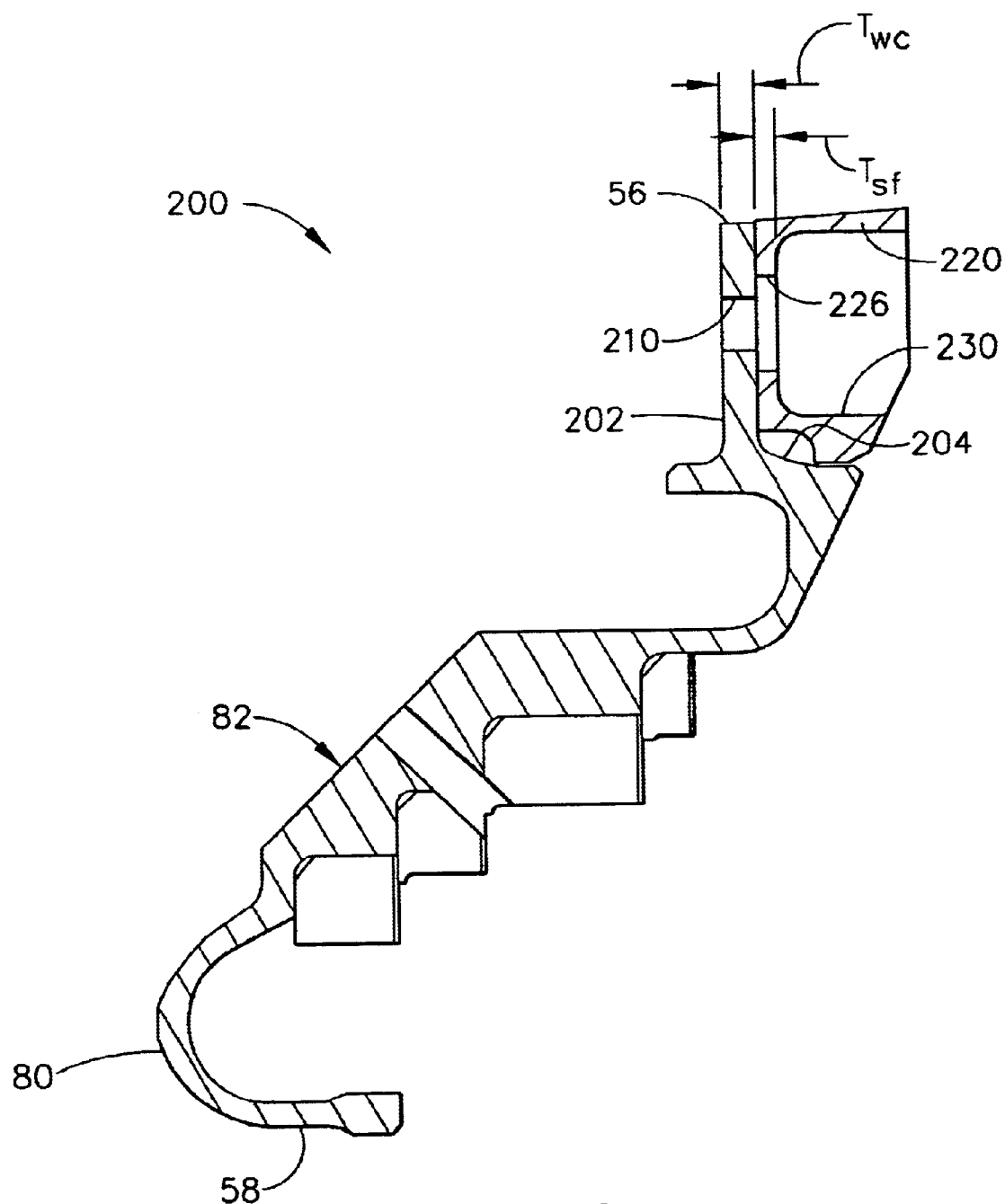
FIG. 6 is a cross-sectional view of a known windage cover that may be used with the gas turbine engine shown in FIG. 1.

FIG. 6 is a cross-sectional view of a known windage cover 200. Windage cover 200 is similar to structural cover 40 (shown in FIGS. 2, 3, 4, and 5) and components in windage cover 200 that are identical to components of structural cover 40 are identified in FIG. 6 using the same reference numerals used in FIGS. 2,3,4, and 5. Accordingly, windage cover 200 includes outer and inner perimeters 56 and 54, lip 80, and body seal portion 82. Windage cover 200 also includes an annular coupling portion 202 that extends between body seal portion 82 and outer perimeter 56. More specifically, coupling portion 202 extends radially outwardly from seal portion 82 to define a shelf 204 extending between coupling portion 202 and seal portion 82. Coupling portion 202 also includes a plurality of openings 210 extending therethrough and spaced circumferentially around windage cover 200 within coupling portion 202.

Each opening 210 is sized to receive a fastener (not shown) therethrough. More specifically, a seal flange 220 is coupled against windage cover 200 and extends circumferentially adjacent cover shelf 204 such that a plurality of openings 226 extending through flange 220 are substantially concentrically aligned with respect to windage cover openings 210. Flange 220 facilitates maintaining a proper alignment of cover 200 when cover 200 is coupled to engine mounting components 106 within engine 10.

Seal flange 220 also defines a recessed area 230 that facilitates shielding fasteners and associated coupling retainers (not shown) used to mount cover 200 within engine 10. More specifically, during assembly, the fasteners are extended through the same structural mounting components 106 (shown in FIG. 5) as fasteners 96 (shown in FIG. 5), however the fasteners extending through windage cover 200 have a length (not shown) that is longer than fastener length 114 (shown in FIG. 5). The increased fastener length is necessary to accommodate a thickness $T_{wc}$ of windage cover coupling portion 202 adjacent openings 210 and an increased thickness $T_{SF}$ of an annular seal flange 220 coupled between windage cover 200 and seal flange recessed area 230.

The above-described structural cover is cost-effective and highly reliable. The unitary cover is integrally formed to include a windage cover portion and a seal flange portion, such that fewer assembly parts are required. The seal flange portion facilitates shielding the mounting fasteners from the gas turbine engine gas flowpath, and also facilitates proper alignment of the cover during installation. Because the cover is integrally formed, a length of mounting fasteners used is shorter than other known covers coupled to the same engine components. Furthermore, the cover includes a plurality of scalloped pockets which reduce an overall weight of the cover in comparison to other known covers coupled to the same engine components. As a result, the integral structural cover facilitates reducing manufacturing costs in a cost-effective and reliable manner.

While the invention has been described in terms of various specific embodiments, those skilled in the art will recognize that the invention can be practiced with modification within the spirit and scope of the claims.

What is claimed is:

1. A method for manufacturing a structural cover for a gas turbine engine, said method comprising:

forming a torrodial body having a frusto-conical cross-sectional profile and including an integrally-formed windage cover portion and a seal flange portion;

forming a plurality of fastener bosses spaced circumferentially along an outer perimeter of the torrodial body with scalloped portions therebetween; and forming a plurality of fastener openings such that each fastener opening extends from a forward side of the torrodial body through a respective fastener boss to an aft side of the torrodial body, such that when installed in the gas turbine engine, the windage cover portion facilitates shielding the fastener openings from a gas flow path.

2. A method in accordance with claim 1 further comprising forming a plurality of scalloped pockets spaced circumferentially along the body outer perimeter such that each scalloped pocket extends arcuately between adjacent fastener bosses.

3. A method in accordance with claim 1 wherein forming a torrodial body further comprises forming the body such that the cover seal flange portion extends partially along the cover outer perimeter.

4. A method in accordance with claim 1 wherein forming a torrodial body further comprises forming the body such that the cover seal flange portion only extends adjacent each of the fastener bosses.

5. A structural cover for a gas turbine engine, said cover comprising a torrodial body having a frusto-conical cross-sectional profile, said body comprises an integrally-formed windage cover portion, a seal flange portion, and a plurality of fastener bosses positioned along an outer perimeter of said cover portion with scalloped portions therebetween at least one fastener opening extends through at least of said fastener bosses and is sized to receive a fastener therethrough, said windage cover portion for shielding the fastener from a gas flow path.

6. A structural cover in accordance with claim 5 further comprising a plurality of scalloped pockets extending arcuately along an outer perimeter of said cover.

7. A structural cover in accordance with claim 6 wherein each said scalloped pocket extends circumferentially between adjacent fastener bosses.

8. A structural cover in accordance with claim 5 wherein said seal flange portion extends at least partially along an outer perimeter of said cover adjacent each said at least one fastener opening.

9. A gas turbine comprising a toroidal structural cover, said cover is frusto-conical and comprises an integrally-formed windage cover portion, a seal flange portion, and a plurality of fastener bosses positioned along an outer perimeter of said cover portion with scalloped portions therebetween, and a plurality of fastener openings extending through each said fastener boss, said windage cover portion configured to facilitate shielding fasteners extending through said fastener bosses and fastener openings from a gas flow path.

10. A gas turbine engine in accordance with claim 9 wherein said cover further comprises a plurality of scalloped pockets extending along an outer perimeter of said cover.

11. A gas turbine engine in accordance with claim 10 wherein said plurality of bosses spaced circumferentially along said cover outer perimeter, each said scalloped pocket extending arcuately between adjacent said bosses.

12. A gas turbine engine in accordance with claim 9 wherein said cover seal flange portion extends at least partially along an outer perimeter of said cover.

13. A gas turbine engine in accordance with claim 12 wherein said cover seal flange portion extends arcuately only adjacent said bosses.

14. A gas turbine engine in accordance with claim 9 wherein said cover comprises a forward side and an opposite aft side, each said boss comprising a recessed opening extending from said cover aft side towards said cover forward side.

* * * * *

UNITED STATES PATENT AND TRADEMARK OFFICE
CERTIFICATE OF CORRECTION

PATENT NO. : 6,761,034 B2
DATED : July 13, 2004
INVENTOR(S) : Niday et al.

It is certified that error appears in the above-identified patent and that said Letters Patent is hereby corrected as shown below:

<u>Title page,</u>
Item [75], Inventors, change the first inventor to -- Scott Patrick Ryczek, Cincinnati, OH (US) -- and change the second inventor to -- David Andrew Niday, Springboro, OH (US) --.
Item [73], Assignee, delete "Electroc" and insert therefor -- Electric --.

Signed and Sealed this

Twelfth Day of October, 2004

JON W. DUDAS
*Director of the United States Patent and Trademark Office*